US011887587B2

(12) United States Patent
Rennies-Hochmuth et al.

(10) Patent No.: US 11,887,587 B2
(45) Date of Patent: Jan. 30, 2024

(54) APPARATUS AND METHOD FOR PROCESSING AN AUDIO INPUT RECORDING TO OBTAIN A PROCESSED AUDIO RECORDING TO ADDRESS PRIVACY ISSUES (71) Applicant: Fraunhofer-Gesellschaft zur Foerderung der angewandten Forschung e.V., Munich (DE)

(72) Inventors: Jan Rennies-Hochmuth, Oldenburg (DE); Danilo Hollosi, Oldenburg (DE); Christian Rollwage, Oldenburg (DE); Jens-Ekkehart Appell, Oldenburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/230,810

(22) Filed: Apr. 14, 2021

(65) Prior Publication Data
US 2022/0335931 A1    Oct. 20, 2022

(51) Int. Cl.
G10L 15/20 (2006.01)
G10L 15/28 (2013.01)
(52) U.S. Cl.
CPC ............ *G10L 15/20* (2013.01); *G10L 15/285* (2013.01)
(58) Field of Classification Search
CPC ................................. G10L 15/20; G10L 25/30
(Continued)

(56) References Cited

U.S. PATENT DOCUMENTS 11,145,306 B1 * 10/2021 Harris ................... G06F 3/0482
2009/0306988 A1   12/2009 Chen et al.
(Continued)

FOREIGN PATENT DOCUMENTS

EP    3693966 A1    8/2020

OTHER PUBLICATIONS

Method and System for Matching an Audio Sample with an Audio Recording An IP.com Prior Art Database Technical Disclosure Authors et. al.: Disclosed Anonymously (Year: 2011).*

(Continued)

*Primary Examiner* — Bharatkumar S Shah
(74) *Attorney, Agent, or Firm* — Perkins Coie LLP; Michael A. Glenn (57) ABSTRACT An apparatus for processing an audio input recording to obtain a processed audio recording according to an embodiment is provided. The apparatus comprises an input interface (110) for receiving a plurality of audio input portions of the audio input recording. Moreover, the apparatus comprises a processor (120) for processing a plurality of audio input portions of the audio input recording to obtain a processed audio recording. The processor (120) is configured to determine, whether or not an audio input portion of the plurality of audio input portions comprises speech. If the processor (120) has detected that the audio input portion comprises speech, the processor (120) is configured to generate the processed audio recording by modifying the audio input portion to obtain a modified audio portion, and by generating the processed audio recording such that the processed audio recording comprises the modified audio portion instead of the audio input portion. Or, if the processor (120) has detected that the audio input portion comprises speech, the processor (120) is configured to generate the processed
(Continued)

audio recording, such that the processed audio recording does not comprise the audio input portion.

27 Claims, 6 Drawing Sheets

(58) Field of Classification Search
USPC .......................................................... 704/246
See application file for complete search history.

(56) References Cited

U.S. PATENT DOCUMENTS

| | | | | |
|---|---|---|---|---|
| 2015/0356973 | A1* | 12/2015 | Wansley | ................. H04M 1/67 704/246 |
| 2016/0180852 | A1* | 6/2016 | Huang | .................... G10L 25/03 704/246 |
| 2019/0348066 | A1 | 11/2019 | Funakoshi | |

OTHER PUBLICATIONS

A. Gabbay, A. Ephrat, T. Halperin and S. Peleg, "Seeing Through Noise: Visually Driven Speaker Separation And Enhancement," 2018 IEEE International Conference on Acoustics, Speech and Signal Processing (ICASSP), Calgary, AB, Canada, 2018, pp. 3051-3055, doi: 10.1109/ICASSP.2018.8462527. (Year: 2018).*

Bitzer, Joerg, et al., "Privacy-Aware Acoustic Assessments of Everyday Life", JAES 64(6), pp. 395-404, pp. 395-404.

Scott, J. F, "Ferroelectric Memories, Chapter 12.1 Ferroelectric Field-Effect Transistors (FETs)", Springer Heidelberg, 2000, 2000, 7 pp.

Qian, Jianwei, et al., "[Uploaded in 3 parts] Speech Sanitizer: Speech Content Desensitization and Voice Anonymization", Qian Jianwei et al.: Speech Sanitizer: Speech Content Desensitization and Voice Anonymization, IEEE Transactions on Dependable and Secure Computing, IEEE Service Center, New York, NY, US, vol. 18, No. 6; 12 pp. XP011887277, ISSN: 1545-5971, DOI: 10.1109/TDSC.2019.2960239, pp. 2631-2634.

* cited by examiner

APPARATUS AND METHOD FOR PROCESSING AN AUDIO INPUT RECORDING TO OBTAIN A PROCESSED AUDIO RECORDING TO ADDRESS PRIVACY ISSUES

The present invention relates to an apparatus and a method for processing an audio input recording to obtain a processed audio recording. In particular, the present invention relates to processing an audio input recording such that privacy aspects are suitably addressed.

BACKGROUND OF THE INVENTION

Acoustical recordings in public space are controversially discussed despite a real necessity for these recordings, for example, for autonomous driving, for ecological monitoring, for noise monitoring, for security related facilities or production facilities. Speech as particularly protectable entity must be particularly protected depending on the situation.

It would be desirable, if recording means would be provided (for example, recording means for the automotive field) that are suitable for recording external sound while at the same time address privacy concerns.

When for example, external microphones of vehicles are considered, data protection and privacy concerns shall be suitably addressed, because speech of pedestrians may, e.g., also be recorded by such recording means that record external sound.

At present, no prior art concepts are known, that examine an audio recording for the presence of speech and that takes measures to filter out speech to address privacy concerns or to make speech non-understandable.

As the prior art does not provide technical solutions, ensuring privacy today occurs usually by organizational means. (Warning signs that recordings are made, declarations of consent, ensuring that no third parties are present, storing data only on strictly protected drives, on which only researchers have access that have been found suitable by an ethics commission) or by extensive manual postprocessing.

Bitzer et al. [1] propose a method which records audio recordings in a very low resolution such that no understandable speech can be reconstructed from such a recording. Such a method ensures privacy, however, audio signal portions which do not exhibit speech activity ae also modified, such that a further processing of such a recording is not useful or is only of limited use.

Starting from the above, there is a need for improvements or enhancements with regard to processing an audio input recording to obtain a processed audio recording such that privacy aspects are suitably addressed.

SUMMARY

An apparatus for processing an audio input recording to obtain a processed audio recording according to an embodiment is provided. The apparatus comprises an input interface for receiving a plurality of audio input portions of the audio input recording. Moreover, the apparatus comprises a processor for processing a plurality of audio input portions of the audio input recording to obtain a processed audio recording. The processor is configured to determine, whether or not an audio input portion of the plurality of audio input portions comprises speech. If the processor has detected that the audio input portion comprises speech, the processor is configured to generate the processed audio recording by modifying the audio input portion to obtain a modified audio portion, and by generating the processed audio recording such that the processed audio recording comprises the modified audio portion instead of the audio input portion. Or, if the processor has detected that the audio input portion comprises speech, the processor is configured to generate the processed audio recording, such that the processed audio recording does not comprise the audio input portion.

Moreover, a method for processing an audio input recording to obtain a processed audio recording according to an embodiment is provided. The method comprises:

Receiving a plurality of audio input portions of the audio input recording. And:

Processing a plurality of audio input portions of the audio input recording to obtain a processed audio recording.

Processing plurality of audio input portions comprises:

Determining, whether or not an audio input portion of the plurality of audio input portions comprises speech.

If it has been detected that the audio input portion comprises speech, the processed audio recording is generated by modifying the audio input portion to obtain a modified audio portion, and by generating the processed audio recording such that the processed audio recording comprises the modified audio portion instead of the audio input portion. Or, if it has been detected that the audio input portion comprises speech, the processed audio recording is generated, such that the processed audio recording does not comprise the audio input portion.

Furthermore, according to an embodiment, a non-transitory computer program product comprising a computer readable medium storing instructions which, when executed on a computer, perform the above-described method is provided.

Moreover, a microphone according to an embodiment is provided, wherein the above-described apparatus is integrated into the microphone.

Furthermore, application-specific integrated circuit according to an embodiment is provided, wherein the above-described apparatus is integrated into the application specific integrated circuit.

Further particular embodiments are provided in the dependent claims.

DETAILED DESCRIPTION OF THE INVENTION

Embodiments of the present invention are now described in more detail with reference to the accompanying drawings, in which the same or similar elements have the same reference signs assigned.

Figure 1:
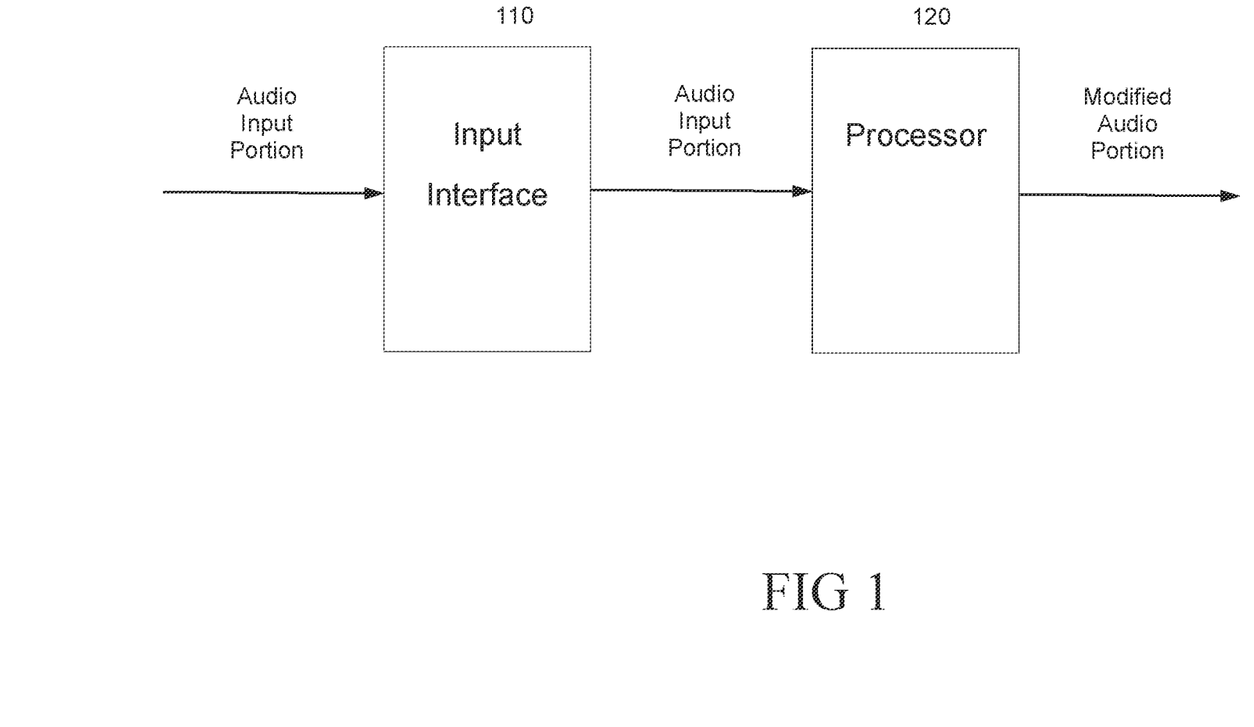
FIG. 1 illustrates an apparatus for processing an audio input recording to obtain a processed audio recording according to an embodiment.

FIG. 1 illustrates an apparatus for processing an audio input recording to obtain a processed audio recording according to an embodiment.

The apparatus comprises an input interface 110 for receiving a plurality of audio input portions of the audio input recording.

Moreover, the apparatus comprises a processor 120 for processing a plurality of audio input portions of the audio input recording to obtain a processed audio recording.

The processor 120 is configured to determine, whether or not an audio input portion of the plurality of audio input portions comprises speech.

If the processor 120 has detected that the audio input portion comprises speech, the processor 120 is configured to generate the processed audio recording by modifying the audio input portion to obtain a modified audio portion, and by generating the processed audio recording such that the processed audio recording comprises the modified audio portion instead of the audio input portion.

Or, if the processor 120 has detected that the audio input portion comprises speech, the processor 120 is configured to generate the processed audio recording, such that the processed audio recording does not comprise the audio input portion.

According to an embodiment, the processor 120 may, e.g., output a result of a determination whether or not the audio input portion comprises speech to another application.

In an embodiment, if the processor 120 has detected that the audio input portion does not comprise speech, the processor 120 may, e.g., be configured to generate the processed audio recording such that the processed audio recording comprises the audio input portion. According to an embodiment, the processor 120 may, e.g., be configured to conduct postprocessing on the processed audio recording to obtain a post-processed audio recording. For example, the processor 120 may, e.g., be configured to resample the processed audio recording to obtain the post-processed audio recording.

According to an embodiment, if the processor 120 has detected that the audio input portion comprises speech and if the audio input portion shall be processed according to a first processing rule, the processor 120 may, e.g., be configured to generate the processed audio recording, such that the processed audio recording does not comprise the audio input portion.

In an embodiment, if the processor 120 has detected that the audio input portion comprises speech and if the audio input portion shall be processed according to a second processing rule, the processor 120 may, e.g., be configured to modify the audio input portion to obtain the modified audio portion such that the speech in the modified audio portion is non-understandable.

According to an embodiment, if the processor 120 has detected that the audio input portion comprises speech and if the audio input portion shall be processed according to a third processing rule, the processor 120 may, e.g., be configured to modify the audio input portion to obtain the modified audio portion such that the speech is filtered out from the audio input portion.

In an embodiment, the processor 120 may, e.g., be configured to modify the audio input portion to obtain the modified audio portion such that the speech is filtered out from the audio input portion by employing a sound source separation concept, such that only non-speech components remain in the processed portion of the audio recording.

According to an embodiment, if the processor 120 has detected that the audio input portion comprises speech and if the audio input portion shall be processed according to a fourth processing rule, the processor 120 may, e.g., be configured to modify the audio input portion to obtain the modified audio portion such that the speech in the modified audio portion remains understandable, but such that it is no longer possible to identify a speaker of the speech by analyzing the modified audio portion.

In an embodiment, if the processor 120 has detected that the audio input portion comprises speech and if the audio input portion shall be processed according to a fifth processing rule, the processor 120 may, e.g., be configured to generate the processed audio recording by employing speaker identification and/or automatic speech recognition and/or voice filtering, such that, if the speech originates from previously identified speakers or from speakers that have trained the apparatus, the speech remains understandable in the modified audio portion; and otherwise, the processed audio recording does not comprise the audio input portion, or the modified audio portion is generated using a voice filter, such that only speech from the previously identified speakers or from the speakers that have trained the apparatus is understandable. Or, the processor 120 may, e.g., be configured to generate the processed audio recording by employing speaker identification and/or automatic speech recognition and/or voice filtering, such that, if the speech originates from the previously identified speakers or from the speakers that have trained the apparatus, the processed audio recording does not comprise the audio input portion, or the modified audio portion is generated using a voice filter, such that the speech from the previously identified speakers or from the speakers that have trained the apparatus is not understandable; and otherwise the speech remains understandable in the modified audio portion.

According to an embodiment, if the processor 120 has detected that the audio input portion comprises speech and if the audio input portion shall be processed according to a sixth processing rule, the processor 120 may, e.g., be configured to generate the processed audio recording by employing automatic speech recognition such that the processed audio recording comprises the audio input portion only if the speech in the audio input portion comprises predefined first key words. And/or the processor 120 may, e.g., be configured to generate the processed audio recording by employing automatic speech recognition such that the processed audio recording comprises the audio input portion only if the speech in the audio input portion does not comprise predefined second key words. And/or the processor 120 may, e.g., be configured to generate the processed audio recording by employing automatic speech recognition such that the processed audio recording comprises the audio input portion only if the speech in the audio input portion does not comprise names.

In an embodiment, if the processor 120 has detected that the audio input portion comprises speech and if the audio input portion shall be processed according to a seventh processing rule, the processor 120 may, e.g., be configured to determine a value indicating a degree of understandability of the speech in the audio input portion, and the processor 120 may, e.g., be configured to generate the processed audio recording such that the processed audio recording comprises the audio input portion depending on said value that indicates the degree of understandability.

According to an embodiment, the processor 120 may, e.g., be configured to conduct a threshold test comparing said value with a threshold value to determine whether or not to generate the processed audio recording such that the processed audio recording comprises the audio input portion.

In an embodiment, the processor 120 may, e.g., be configured to process the audio input portion according a first one of a group of processing rules, the group of processing rules may, e.g., comprise at least two of the first processing rule, and the second processing rule, and the third processing rule, and the fourth processing rule, and the fifth processing rule, and the sixth processing rule, and the seventh processing rule. The processor 120 may, e.g., be configured to process another one of the plurality of audio input portions according a second one of the group of processing rules, wherein the second one of the group of processing rules may, e.g., be different from the first one of the group of processing rules.

Figure 2:
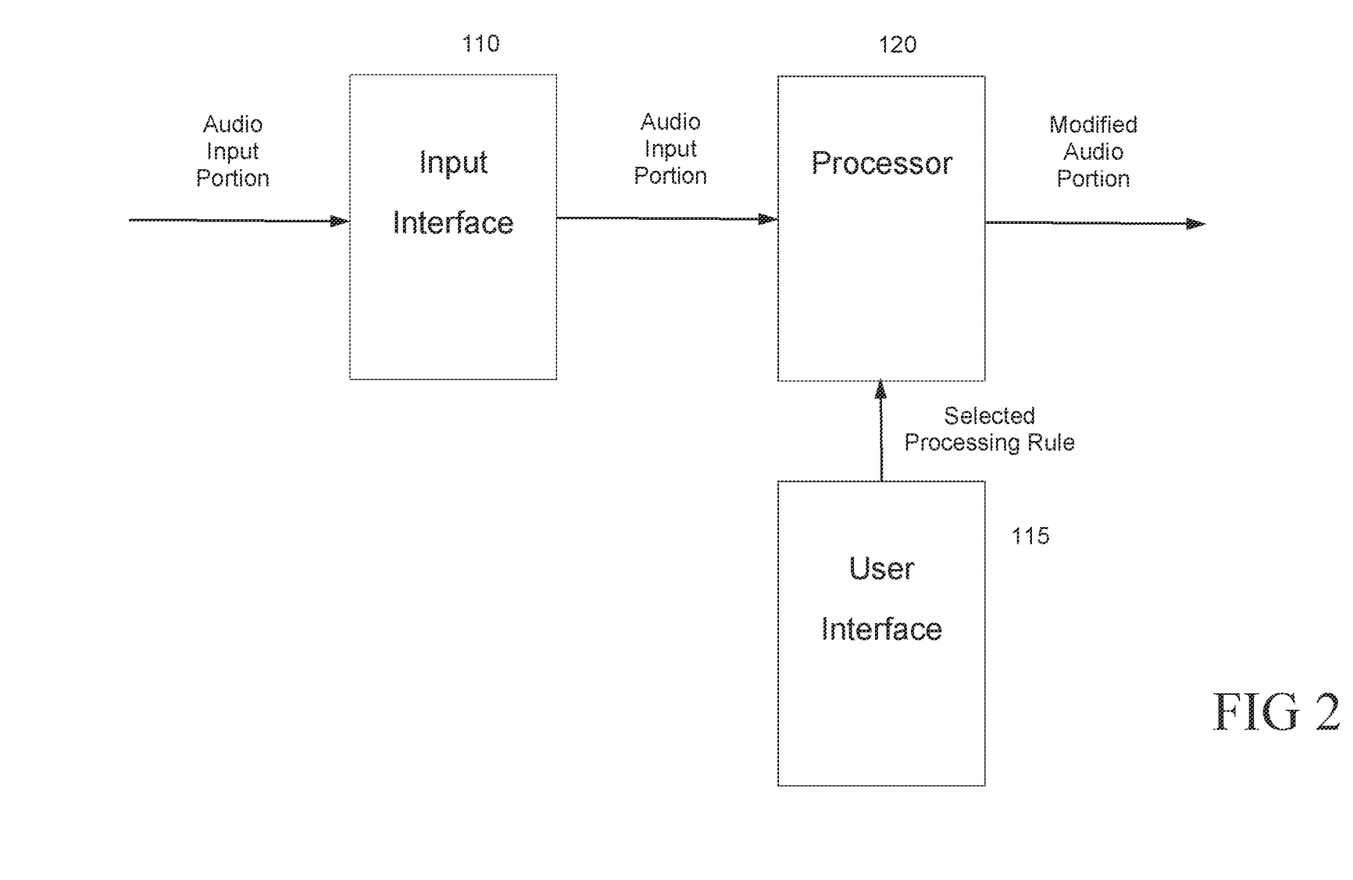
FIG. 2 illustrates an apparatus according to an embodiment, wherein the apparatus further comprises a user interface.

FIG. 2 illustrates an apparatus according to an embodiment, wherein the apparatus further comprises a user interface 115. The user interface 115 is configured to provide means for a user to select a processing rule out of a group of processing rules, wherein the group of processing rules may, e.g., comprise at least two of the first processing rule, and the second processing rule, and the third processing rule, and the fourth processing rule, and the fifth processing rule, and the sixth processing rule, and the seventh processing rule. The processor 120 is configured to process the audio input portion according to the processing rule selected by the user.

According to an embodiment, the group of processing rules may, e.g., comprise at least three of the first processing rule and the second processing and the third processing rule and the fourth processing rule and the fifth processing rule and the sixth processing rule and the seventh processing rule;

In an embodiment, the group of processing rules may, e.g., comprise at least four of the first processing rule and the second processing and the third processing rule and the fourth processing rule and the fifth processing rule and the sixth processing rule and the seventh processing rule;

According to an embodiment, the group of processing rules may, e.g., comprise at least five of the first processing rule and the second processing and the third processing rule and the fourth processing rule and the fifth processing rule and the sixth processing rule and the seventh processing rule;

In an embodiment, the group of processing rules may, e.g., comprise at least six of the first processing rule and the second processing and the third processing rule and the fourth processing rule and the fifth processing rule and the sixth processing rule and the seventh processing rule;

According to an embodiment, the group of processing rules may, e.g., comprise the first processing rule and the second processing and the third processing rule and the fourth processing rule and the fifth processing rule and the sixth processing rule and the seventh processing rule.

In an embodiment, the processor 120 may, e.g., be configured to determine, whether or not the audio input portion comprises speech using machine-learning speech activity detection.

Figure 3:
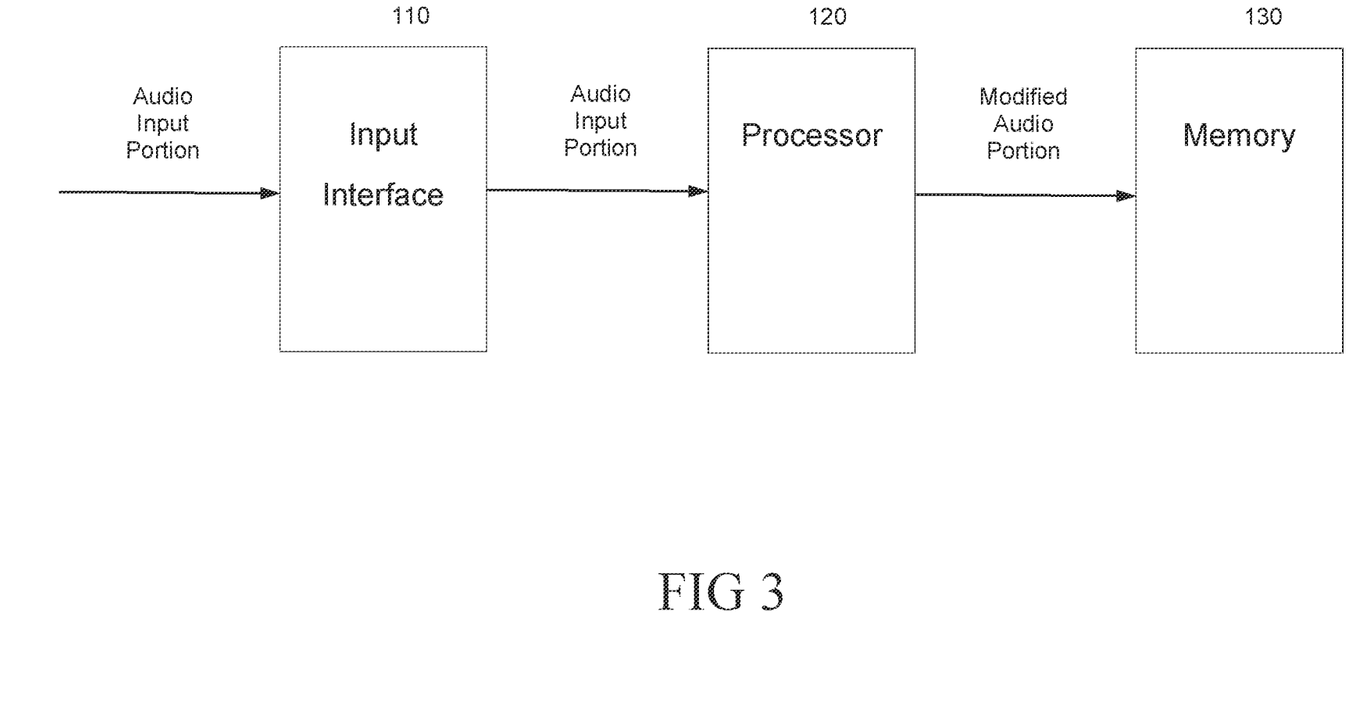
FIG. 3 illustrates an apparatus according to an embodiment, wherein the apparatus further comprises a memory.

According to an embodiment, the processor 120 may, e.g., be configured to store the processed audio recording in a memory 130.

FIG. 3 illustrates an apparatus according to an embodiment, wherein the apparatus further comprises the memory 130.

In an embodiment, the processor 120 may, e.g., be configured to store the audio input portion in the memory 130. The processor 120 may, e.g., be configured to process the audio input portion according to the first processing rule, or according to the second processing rule, or according to the third processing rule, or according to the fourth processing rule, or according to the fifth processing rule, or according to the sixth processing rule, or according to the seventh processing rule, and wherein the processor 120 may, e.g., be configured to replace the audio input portion in the memory 130 by the modified audio portion or to remove the audio input portion from the memory 130 without replacement depending on the processing. According to an embodiment, the processor 120, may, e.g., store information in the memory, wherein said information may, e.g., indicate whether or not speech is present in the audio input portion.

According to an embodiment, the processor 120 may, e.g., be configured to determine metadata, such that the metadata indicates how many speakers are present in the audio input portion, and/or such that the metadata indicates whether a speaker is male or female, and/or such that the metadata indicates whether or not background sound is present and/or such that the metadata indicates which types of background sound are present and/or such that the metadata describes deleted or alienated portions of the audio input recording.

In an embodiment, the metadata indicates why the deleted or alienated portions of the audio input recording have been deleted or have been alienated.

Figure 4:
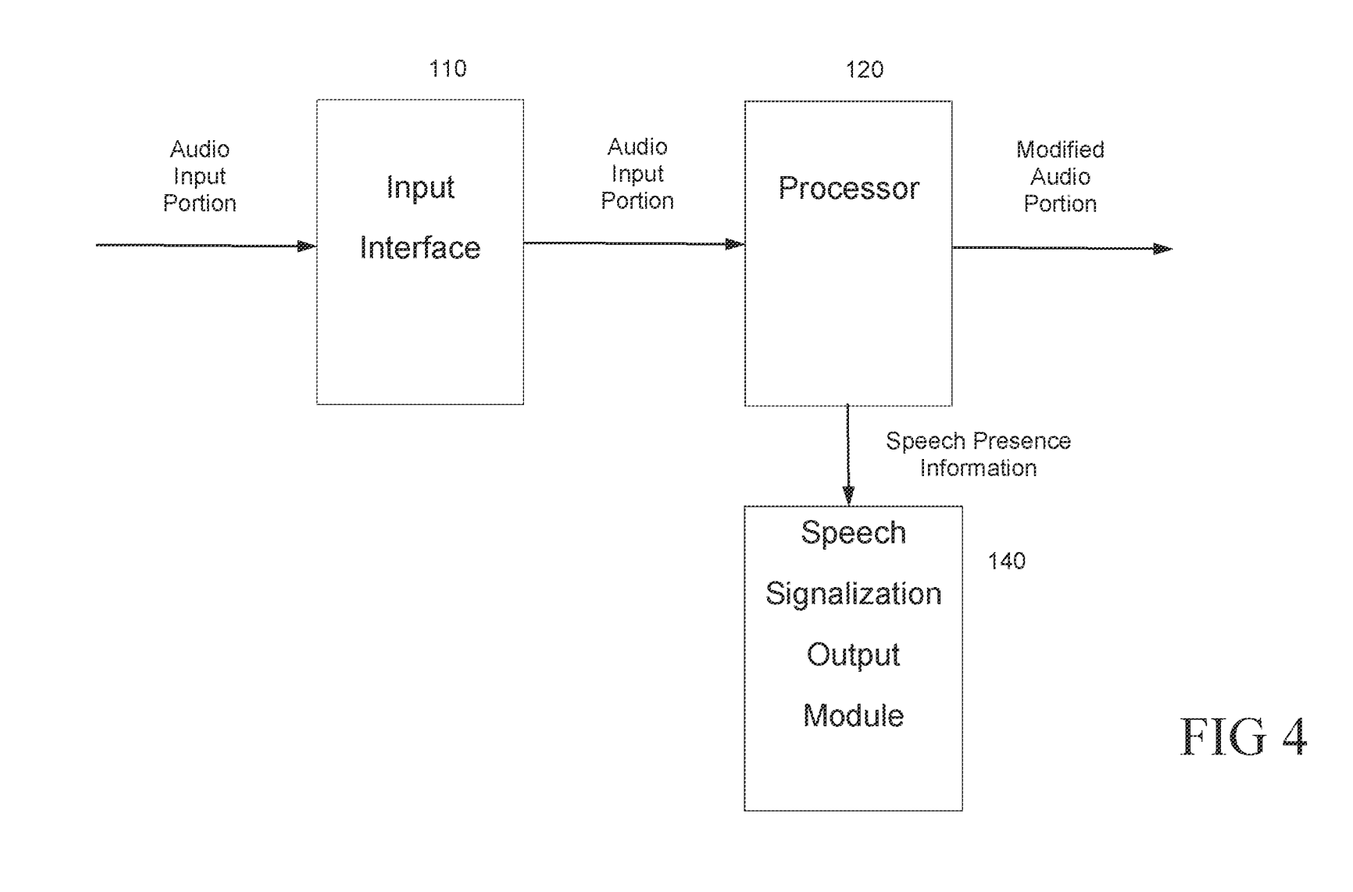
FIG. 4 illustrates an apparatus according to an embodiment, wherein the apparatus further comprises a speech signalization output module.

FIG. 4 illustrates an apparatus according to an embodiment, wherein the apparatus further comprises a speech signalization output module 140 configured to signalize whether or not speech is detected, by using a display and/or by using an acoustical signal, and/or by using an optical signal and/or by using a haptic signal, and/or by using an electronic signal.

Figure 5:
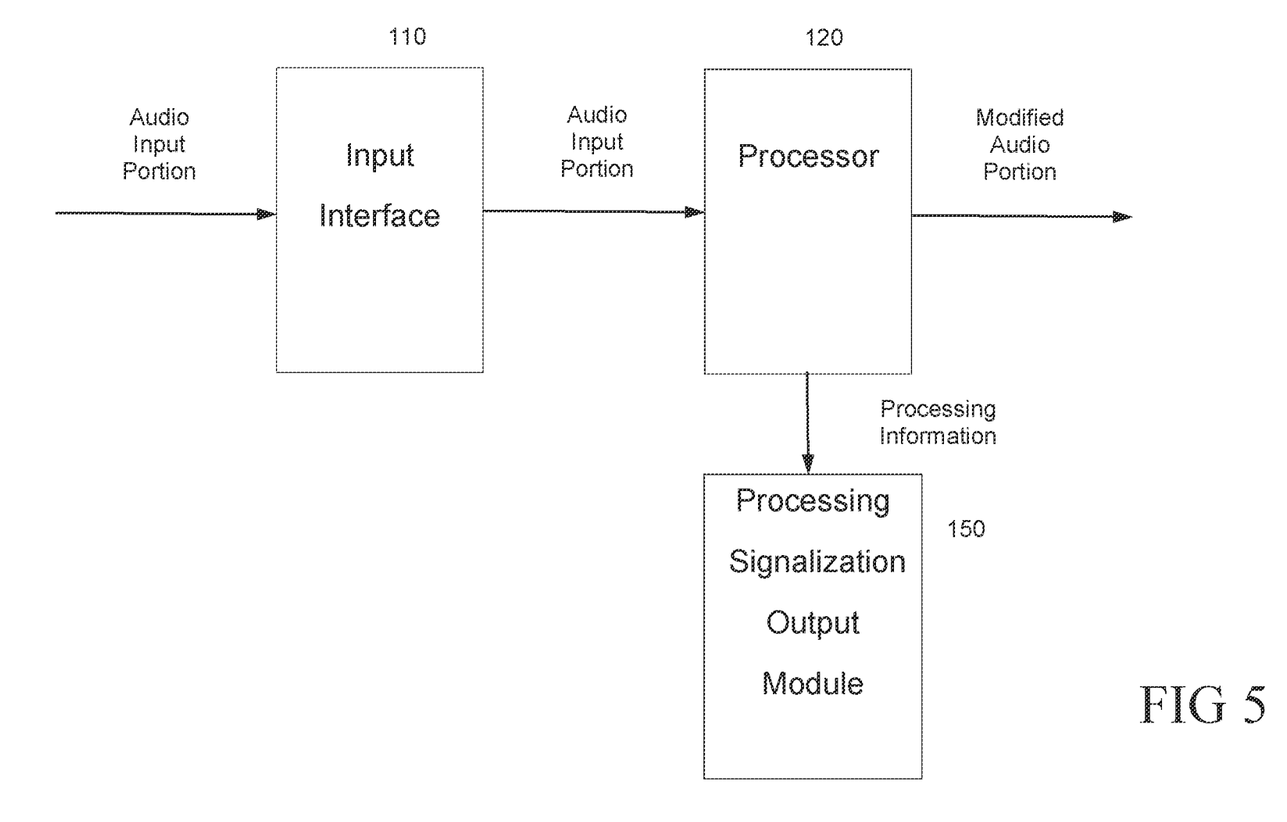
FIG. 5 illustrates an apparatus according to an embodiment, wherein the apparatus further comprises a processing signalization output module.

FIG. 5 illustrates an apparatus according to an embodiment, wherein the apparatus further comprises a processing signalization output module 150 configured to signalize, if a processing rule for processing the audio input recording is applied; and/or to signalize which of a plurality of processing rules for processing the audio input recording are applied; and/or which of a plurality of processing rules for processing the audio input recording are not applied. The processing signalization output module 150 is configured to use a display and/or to use an acoustical signal, and/or to use an optical signal and/or to use a haptic signal, and/or to use an electronic signal for the signaling.

Figure 6:
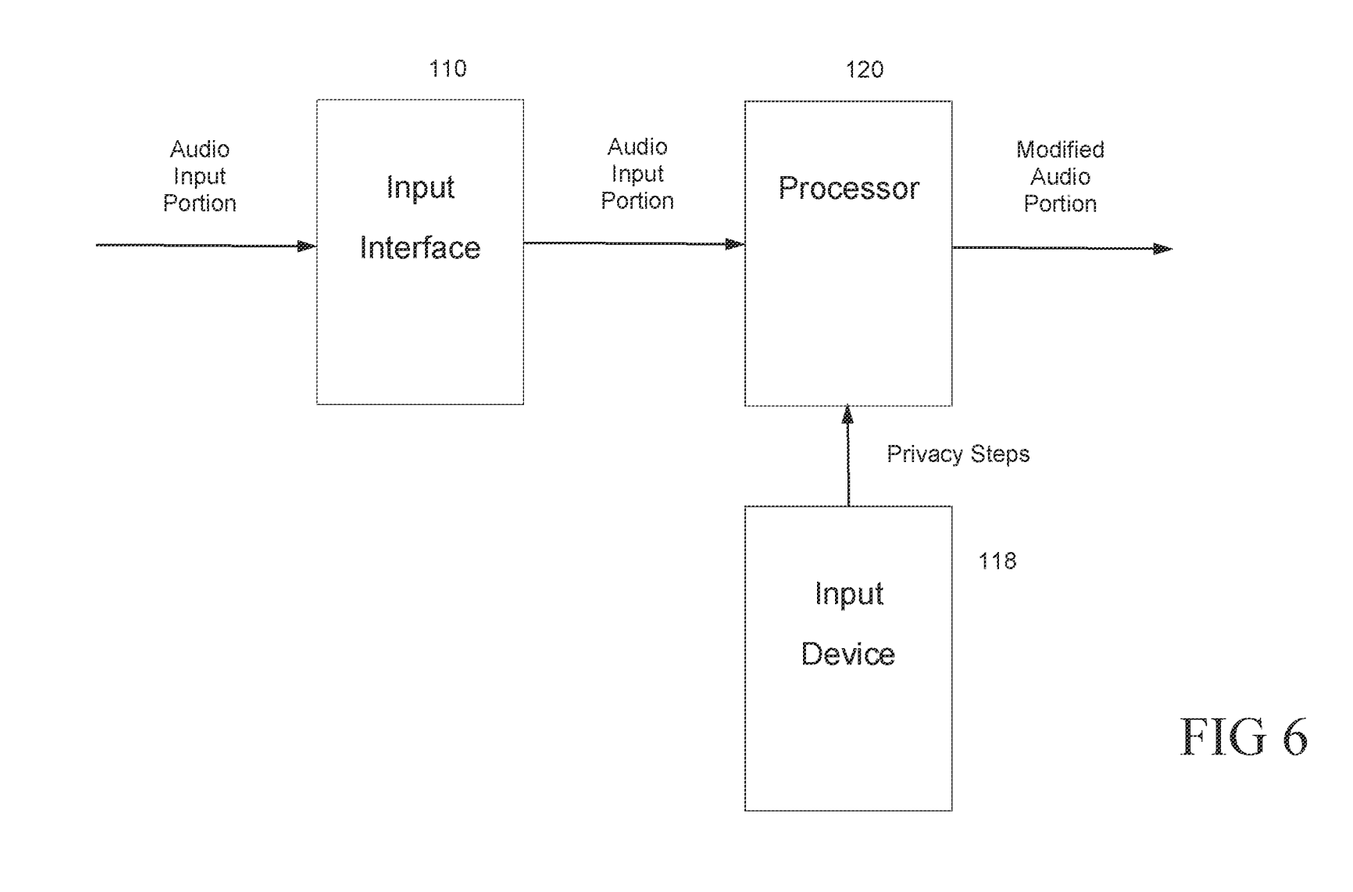
FIG. 6 illustrates an apparatus according to an embodiment, wherein the apparatus further comprises an input device.

FIG. 6 illustrates an apparatus according to an embodiment, wherein the apparatus further comprises an input device 118 configured to enable a user to input which steps shall be taken to ensure privacy when the modified audio recording is stored.

In an embodiment, the apparatus may, e.g., be adapted to be used in a public environment.

In the following, particular embodiments of the invention are described.

Models, for example, based on machine learning, ML, are employed to determine information that indicates whether or not a recording, for example, a recording of a microphone or of a solid-borne sound sensor, comprises speech. In other words: voice activity detection, VAD, or speech activity detection, SAD. This information is employed to control or to modify a recording.

For example, according to an embodiment, speech activity detection, e.g., ML-speech activity detection, is conducted for an audio recording.

If no speech is detected, the audio recording is stored for further usage.

If speech is detected, one of the following embodiments is applied:

According to a first embodiment, the portion of the audio recording, for which speech is detected, is not stored, which results in a gap in the stored audio recording.

According to a second embodiment, the portion of the audio recording, for which speech is detected, is modified such that said audio portion becomes non-understandable (e.g., by applying one of the concepts proposed by Bitzer et al. [1]), such that a reconstruction of the spoken word becomes impossible.

According to a third embodiment, in the portion of the audio recording, for which speech is detected, speech is filtered out, e.g., by employing a sound source separation concept, such that only non-speech components remain in the processed portion of the audio recording.

According to a fourth embodiment, the portion of the audio recording, for which speech is detected, is modified such that the speech remains understandable, but it is no longer possible to identify the speaker from said processed portion of the audio recording.

According to a fifth embodiment, speaker identification and/or automatic speech recognition and/or voice filtering is employed, such that, if the speech originates from previously identified speakers or from speakers that have trained the apparatus, the portion of the audio recording, for which speech is detected, is recorded, such that the speech remains understandable; and otherwise, the portion of the audio recording, for which speech is detected, is not recorded, or is recorded using voice filter, such that only speech of predefined speakers is understandable. In a further embodiment, speech is only stored, if the speech portion does not originate from a predefined speaker.

According to a sixth embodiment, an automatic speech recognizer is employed such that speech is only stored, if the speech comprises predefined key words (for example, if an audio recording comprises a command for a machine). Other speech portions are not stored or are modified to be non-understandable. In an embodiment, all speech components that are not names are stored. In a further embodiment, speech is only stored, if the speech portion does not comprise key words (confidentiality).

According to a seventh embodiment, a speech understandability is determined, for example, by conducting a model calculation or model estimation. A model estimates a current understandability and a (e.g., non-binary) threshold value is employed to determine whether or not to store the audio data.

In the following, further particular embodiments are employed:

According to a further embodiment, an audio recording is stored completely and after a predefined time period, one of the above described embodiments is applied. For example, a complete audio recording may, e.g., be recorded on the edge or in the cloud, as this may, e.g., be necessary for automatic speech recognition. Afterwards, portions of the audio recording, which comprise speech, are deleted or modified according to the described embodiments.

In another embodiment, the apparatus comprises an interface to select one of the above-described embodiments, for example depending on an application scenario.

In a further embodiment, metadata is determined and/or stored that relate to the audio recording. For example, the metadata may, e.g., indicate how may speakers are present, and/or may, e.g., indicate whether a speaker is male or female, and/or may, e.g., indicate whether or not background sound is present and/or which types of background sounds are present, etc.). In an embodiment, metadata may, e.g., be determined or stored to describe deleted or alienated portions of the audio recording. For example, the metadata may, e.g., indicate or may, e.g., allow to determine why the deleted or alienated portions of the audio recording have been deleted or have been alienated.

According to another embodiment, a recording device is provided that signalizes (for example, in real-time) whether or not speech is detected, using a display and/or using an acoustical signal, and/or using an optical signal and/or using a haptic signal, and/or using an electronic signal.

In another embodiment, a recording device is provided that signals, if one of the above-described embodiments for modifying the audio recording is applied; and/or which of the above-described embodiments for modifying the audio recording are applied; and/or which of the above-described embodiments for modifying the audio recording are not applied. For example, said information may, e.g., be provided to a user using a display and/or using an acoustical signal, and/or using an optical signal and/or using a haptic signal, and/or using an electronic signal.

According to a further embodiment, a device is provided, that enables a user to input (e.g., by using a button and/or by using a switch) which steps to ensure privacy shall be taken, for example, if the user has detected that speech activity has erroneously been not detected, and/or if the user does not want to rely on a decision of the speech activity detection.

In another embodiment, an input by the user is employed to improve one or more of the (e.g., employed) concepts for speech activity detection. For example, a post-training concept and/or reinforcement learning may, e.g., be employed.

Embodiments of the invention realize or support compliance of laws.

In embodiments, the above-described embodiments, may, e.g., be integrated into a microphone, or may, e.g., be implemented by an application-specific integrated circuit (ASIC), and allow to apply said audio technology in a public environment.

Embodiments of the invention may, e.g., be employed and are essential for all applications, which use microphones that are installed in a public environment or at workplaces, in particular, if recordings of clear speech signals are necessary.

Embodiments of the invention may, e.g., employed in measurement devices for vehicles which comprise one or more sensors, e.g., one or more microphones.

Moreover, embodiments of the invention may, e.g., employed for recording devices employed in factories.

Moreover, embodiments of the invention may, e.g., employed for smart speakers or voice-controlled assistive devices.

Furthermore, embodiments of the invention may, e.g., employed in dosimeters for measuring noise, which shall not evaluate speech.

Moreover, embodiments of the invention may, e.g., employed in software products for modifying audio recordings (e.g., in real-time, or, e.g., offline), which may, e.g., be realized as a stand-alone software product, or, e.g., as a plugin, for example, in an audio editor, or, e.g., in digital audio workstations.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Although each claim only refers back to one single claim, the disclosure also covers any conceivable combination of claims.

REFERENCES

[1] Bitzer, J., Kissner, S. & Holube, I.: Privacy-Aware Acoustic Assessments of Everyday Life. JAES 64(6), pp. 395-404.

The invention claimed is:

1. An apparatus for processing an audio input recording to obtain a processed audio recording, wherein the apparatus comprises:
   an input interface for receiving a plurality of audio input portions of the audio input recording, and
   a processor for processing a plurality of audio input portions of the audio input recording to obtain a processed audio recording,
   wherein the processor is configured to determine, whether or not an audio input portion of the plurality of audio input portions comprises speech,
   wherein, if the processor has detected that the audio input portion comprises speech, the processor is configured to generate the processed audio recording by modifying the audio input portion to obtain a modified audio portion, and by generating the processed audio recording such that the processed audio recording comprises the modified audio portion instead of the audio input portion,
   wherein, if the processor has detected that the audio input portion comprises speech and if the audio input portion shall be processed according to a particular processing rule, the processor is configured to generate the processed audio recording by employing automatic speech recognition and/or speaker identification, such that, if the speech originates from previously identified speakers or from speakers that have trained the apparatus, the speech remains understandable in the modified audio portion; and otherwise, the processed audio recording does not comprise the audio input portion, or the modified audio portion is generated using a voice filter, such that only speech from the previously identified speakers or from the speakers that have trained the apparatus is understandable.

2. The apparatus according to claim 1,
   wherein, if the processor has detected that the audio input portion does not comprise speech, the processor is configured to generate the processed audio recording such that the processed audio recording comprises the audio input portion.

3. The apparatus according to claim 1,
wherein, if the processor has detected that the audio input portion comprises speech and if the audio input portion shall be processed according to a first processing rule, the processor is configured to generate the processed audio recording, such that the processed audio recording does not comprise the audio input portion.

4. The apparatus according to claim 1,
wherein, if the processor has detected that the audio input portion comprises speech and if the audio input portion shall be processed according to a second processing rule, the processor is configured to modify the audio input portion to obtain the modified audio portion such that the speech in the modified audio portion is non-understandable.

5. The apparatus according to claim 1,
wherein, if the processor has detected that the audio input portion comprises speech and if the audio input portion shall be processed according to a third processing rule, the processor is configured to modify the audio input portion to obtain the modified audio portion such that the speech is filtered out from the audio input portion.

6. The apparatus according to claim 5,
wherein the processor is configured to modify the audio input portion to obtain the modified audio portion such that the speech is filtered out from the audio input portion by employing a sound source separation concept, such that only non-speech components remain in the processed portion of the audio recording.

7. The apparatus according to claim 1,
wherein, if the processor has detected that the audio input portion comprises speech and if the audio input portion shall be processed according to a fourth processing rule, the processor is configured to modify the audio input portion to obtain the modified audio portion such that the speech in the modified audio portion remains understandable, but such that it is no longer possible to identify a speaker of the speech by analyzing the modified audio portion.

8. The apparatus according to claim 1,
wherein, if the processor has detected that the audio input portion comprises speech and if the audio input portion shall be processed according to a sixth processing rule,
the processor is configured to generate the processed audio recording by employing automatic speech recognition such that the processed audio recording comprises the audio input portion only if the speech in the audio input portion comprises predefined first key words; and/or
the processor is configured to generate the processed audio recording by employing automatic speech recognition such that the processed audio recording comprises the audio input portion only if the speech in the audio input portion does not comprise predefined second key words; and/or
the processor is configured to generate the processed audio recording by employing automatic speech recognition such that the processed audio recording comprises the audio input portion only if the speech in the audio input portion does not comprise names.

9. The apparatus according to claim 1,
wherein, if the processor has detected that the audio input portion comprises speech and if the audio input portion shall be processed according to a seventh processing rule, the processor is configured to determine a value indicating a degree of understandability of the speech in the audio input portion, and the processor is configured to generate the processed audio recording such that the processed audio recording comprises the audio input portion depending on said value that indicates the degree of understandability.

10. The apparatus according to claim 9,
wherein the processor is configured to conduct a threshold test comparing said value with a threshold value to determine whether or not to generate the processed audio recording such that the processed audio recording comprises the audio input portion.

11. The apparatus according to claim 1,
wherein the processor is configured to process the audio input portion according a first one of a group of processing rules, wherein the group of processing rules comprises at least two of a first processing rule and a second processing rule and a third processing rule and a fourth processing rule and a fifth processing rule and a sixth processing rule and a seventh processing rule;
wherein the processor is configured to process another one of the plurality of audio input portions according a second one of the group of processing rules, wherein the second one of the group of processing rules is different from the first one of the group of processing rules;
wherein according to the first processing rule, the processor is configured to generate the processed audio recording, such that the processed audio recording does not comprise the audio input portion;
wherein according to the second processing rule, the processor is configured to modify the audio input portion to obtain the modified audio portion such that the speech in the modified audio portion is non-understandable;
wherein according to the third processing rule, the processor is configured to modify the audio input portion to obtain the modified audio portion such that the speech is filtered out from the audio input portion;
wherein according to the fourth processing rule, the processor is configured to modify the audio input portion to obtain the modified audio portion such that the speech in the modified audio portion remains understandable, but such that it is no longer possible to identify a speaker of the speech by analyzing the modified audio portion;
wherein, according to the fifth processing rule being the particular processing rule, the processor is configured to generate the processed audio recording by employing said automatic speech recognition and/or said speaker identification, such that, if the speech originates from said previously identified speakers or from said speakers that have trained the apparatus, the speech remains understandable in the modified audio portion; and otherwise, the processed audio recording does not comprise the audio input portion, or the modified audio portion is generated using voice filter, such that only speech from the previously identified speakers or from the speakers that have trained the apparatus is understandable;
wherein according to the sixth processing rule, the processor is configured to generate the processed audio recording by employing automatic speech recognition such that the processed audio recording comprises the audio input portion only if the speech in the audio input portion comprises predefined first key words; and/or the processor is configured to generate the processed audio recording by employing automatic speech recognition such that the processed audio recording comprises the audio input portion only if the speech in the audio input portion does not comprise predefined second key words; and/or the processor is configured to generate the processed audio recording by employing automatic speech recognition such that the processed audio recording comprises the audio input portion only if the speech in the audio input portion does not comprise names; and wherein according to the seventh processing rule, the processor is configured to determine a value indicating a degree of understandability of the speech in the audio input portion, and the processor is configured to generate the processed audio recording such that the processed audio recording comprises the audio input portion depending on said value that indicates the degree of understandability.

12. The apparatus according to claim 1, wherein the apparatus comprises a user interface, wherein the user interface is configured to provide means for a user to select a processing rule out of a group of processing rules comprising at least two of a first processing rule and a second processing rule and a third processing rule and a fourth processing rule and a fifth processing rule and a sixth processing rule and a seventh processing rule;

wherein the processor is configured to process the audio input portion according to the processing rule selected by the user;

wherein according to the first processing rule, the processor is configured to generate the processed audio recording, such that the processed audio recording does not comprise the audio input portion;

wherein according to the second processing rule, the processor is configured to modify the audio input portion to obtain the modified audio portion such that the speech in the modified audio portion is non-understandable;

wherein according to the third processing rule, the processor is configured to modify the audio input portion to obtain the modified audio portion such that the speech is filtered out from the audio input portion;

wherein according to the fourth processing rule, the processor is configured to modify the audio input portion to obtain the modified audio portion such that the speech in the modified audio portion remains understandable, but such that it is no longer possible to identify a speaker of the speech by analyzing the modified audio portion;

wherein, according to the fifth processing rule being the particular processing rule, the processor is configured to generate the processed audio recording by employing said automatic speech recognition and/or said speaker identification, such that, if the speech originates from said previously identified speakers or from said speakers that have trained the apparatus, the speech remains understandable in the modified audio portion; and otherwise, the processed audio recording does not comprise the audio input portion, or the modified audio portion is generated using said voice filter, such that only speech from the previously identified speakers or from the speakers that have trained the apparatus is understandable;

wherein according to the sixth processing rule, the processor is configured to generate the processed audio recording by employing automatic speech recognition such that the processed audio recording comprises the audio input portion only if the speech in the audio input portion comprises predefined first key words; and/or the processor is configured to generate the processed audio recording by employing automatic speech recognition such that the processed audio recording comprises the audio input portion only if the speech in the audio input portion does not comprise predefined second key words; and/or the processor is configured to generate the processed audio recording by employing automatic speech recognition such that the processed audio recording comprises the audio input portion only if the speech in the audio input portion does not comprise names; and wherein according to the seventh processing rule, the processor is configured to determine a value indicating a degree of understandability of the speech in the audio input portion, and the processor is configured to generate the processed audio recording such that the processed audio recording comprises the audio input portion depending on said value that indicates the degree of understandability.

13. The apparatus according to claim 11 or 12, wherein the group of processing rules comprises at least three of the first processing rule and the second processing rule and the third processing rule and the fourth processing rule and the fifth processing rule and the sixth processing rule and the seventh processing rule; or wherein the group of processing rules comprises at least four of the first processing rule and the second processing rule and the third processing rule and the fourth processing rule and the fifth processing rule and the sixth processing rule and the seventh processing rule; or wherein the group of processing rules comprises at least five of the first processing rule and the second processing rule and the third processing rule and the fourth processing rule and the fifth processing rule and the sixth processing rule and the seventh processing rule; or wherein the group of processing rules comprises at least six of the first processing rule and the second processing rule and the third processing rule and the fourth processing rule and the fifth processing rule and the sixth processing rule and the seventh processing rule; or wherein the group of processing rules comprises the first processing rule and the second processing rule and the third processing rule and the fourth processing rule and the fifth processing rule and the sixth processing rule and the seventh processing rule.

14. The apparatus according to claim 1, wherein the processor is configured to determine, whether or not the audio input portion comprises speech using machine-learning speech activity detection.

15. The apparatus according to claim 1, wherein the processor is configured to store the processed audio recording in a memory.

16. The apparatus according to claim 15, wherein the apparatus comprises the memory.

17. The apparatus according to claim 15, wherein the processor is configured to store the audio input portion in the memory, and wherein the processor is configured to process the audio input portion according to a first processing rule or according to a second processing rule or according to a third processing rule or according to a fourth processing rule or according to a fifth processing rule or according to a sixth processing rule or according to a seventh processing rule; and wherein the processor is configured to replace the audio input portion in the memory by the modified audio portion or to remove the audio input portion from the memory without replacement depending on the processing;

wherein according to the first processing rule, the processor is configured to generate the processed audio recording, such that the processed audio recording does not comprise the audio input portion;

wherein according to the second processing rule, the processor is configured to modify the audio input portion to obtain the modified audio portion such that the speech in the modified audio portion is non-understandable;

wherein according to the third processing rule, the processor is configured to modify the audio input portion to obtain the modified audio portion such that the speech is filtered out from the audio input portion;

wherein according to the fourth processing rule, the processor is configured to modify the audio input portion to obtain the modified audio portion such that the speech in the modified audio portion remains understandable, but such that it is no longer possible to identify a speaker of the speech by analyzing the modified audio portion;

wherein according to the fifth processing rule, the processor is configured to generate the processed audio recording by employing speaker identification and/or automatic speech recognition and/or voice filtering, such that, if the speech originates from previously identified speakers or from speakers that have trained the apparatus, the speech remains understandable in the modified audio portion; and otherwise, the processed audio recording does not comprise the audio input portion, or the modified audio portion is generated using a voice filter, such that only speech from the previously identified speakers or from the speakers that have trained the apparatus is understandable; or the processor is configured to generate the processed audio recording by employing speaker identification and/or automatic speech recognition and/or voice filtering, such that, if the speech originates from previously identified speakers or from speakers that have trained the apparatus, the processed audio recording does not comprise the audio input portion, or the modified audio portion is generated using a voice filter, such that the speech from the previously identified speakers or from the speakers that have trained the apparatus is not understandable; and otherwise the speech remains understandable in the modified audio portion;

wherein according to the sixth processing rule, the processor is configured to generate the processed audio recording by employing automatic speech recognition such that the processed audio recording comprises the audio input portion only if the speech in the audio input portion comprises predefined first key words; and/or the processor is configured to generate the processed audio recording by employing automatic speech recognition such that the processed audio recording comprises the audio input portion only if the speech in the audio input portion does not comprise predefined second key words; and/or the processor is configured to generate the processed audio recording by employing automatic speech recognition such that the processed audio recording comprises the audio input portion only if the speech in the audio input portion does not comprise names; and wherein according to the seventh processing rule, the processor is configured to determine a value indicating a degree of understandability of the speech in the audio input portion, and the processor is configured to generate the processed audio recording such that the processed audio recording comprises the audio input portion depending on said value that indicates the degree of understandability.

18. The apparatus according to claim 1,
wherein the processor is configured to determine metadata, such that the metadata indicates how many speakers are present in the audio input portion, and/or such that the metadata indicates whether a speaker is male or female, and/or such that the metadata indicates whether or not background sound is present and/or such that the metadata indicates which types of background sound are present and/or such that the metadata describes deleted or alienated portions of the audio input recording.

19. The apparatus according to claim 18,
wherein the metadata indicates why the deleted or alienated portions of the audio input recording have been deleted or have been alienated.

20. The apparatus according to claim 1,
wherein the apparatus is configured to signalize whether or not speech is detected, by using a display and/or by using an acoustical signal, and/or by using an optical signal and/or by using a haptic signal, and/or by using an electronic signal.

21. The apparatus according to claim 1,
wherein the apparatus is configured to signalize, if a processing rule for processing the audio input recording is applied; and/or wherein the apparatus is configured to signalize which of a plurality of processing rules for processing the audio input recording are applied; and/or which of a plurality of processing rules for processing the audio input recording are not applied;
wherein the apparatus is configured to use a display and/or to use an acoustical signal, and/or to use an optical signal and/or wherein the apparatus is configured to use a haptic signal, and/or to use an electronic signal for the signaling.

22. The apparatus according to claim 1,
wherein the apparatus further is configured to enable a user to input which steps shall be taken to ensure privacy when the modified audio recording is stored.

23. The apparatus according to claim 1,
wherein the apparatus is adapted to be used in a public environment.

24. The apparatus according to claim 1, wherein the apparatus comprises a microphone.

25. The apparatus according to claim 1, wherein the apparatus comprises an application specific integrated circuit.

26. A method for processing an audio input recording to obtain
a processed audio recording, wherein the method comprises:
receiving a plurality of audio input portions of the audio input recording, and
processing a plurality of audio input portions of the audio input recording to obtain a processed audio recording, wherein processing the plurality of audio input portions comprises:

determining, whether or not an audio input portion of the plurality of audio input portions comprises speech, if it has been detected that the audio input portion comprises speech, the processed audio recording is generated by modifying the audio input portion to obtain a modified audio portion, and by generating the processed audio recording such that the processed audio recording comprises the modified audio portion instead of the audio input portion, wherein, if it has been detected that the audio input portion comprises speech and if the audio input portion shall be processed according to a particular processing rule, generating the processed audio recording is conducted by employing automatic speech recognition and/or speaker identification, such that, if the speech originates from previously identified speakers or from speakers that have trained the apparatus, the speech remains understandable in the modified audio portion; and otherwise, the processed audio recording does not comprise the audio input portion, or the modified audio portion is generated using a voice filter, such that only speech from the previously identified speakers or from the speakers that have trained the apparatus is understandable.

27. A non-transitory computer program product comprising a computer readable medium storing instructions which, when executed on a computer, perform the method according to claim 26.

\* \* \* \* \*